Dec. 19, 1933.    C. E. MILLER    1,940,221
CEMENT BAG
Filed March 16, 1931
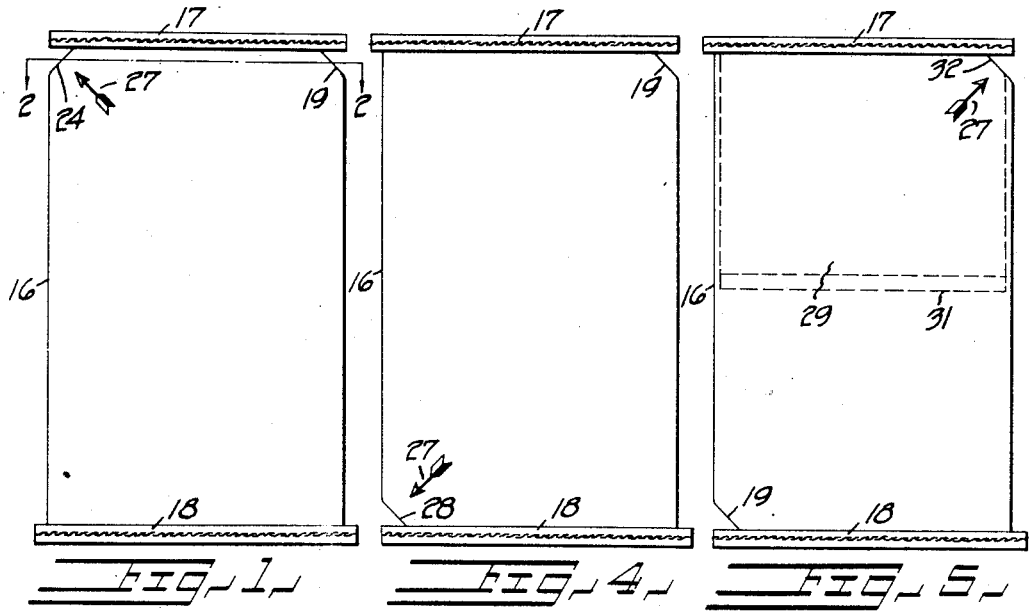
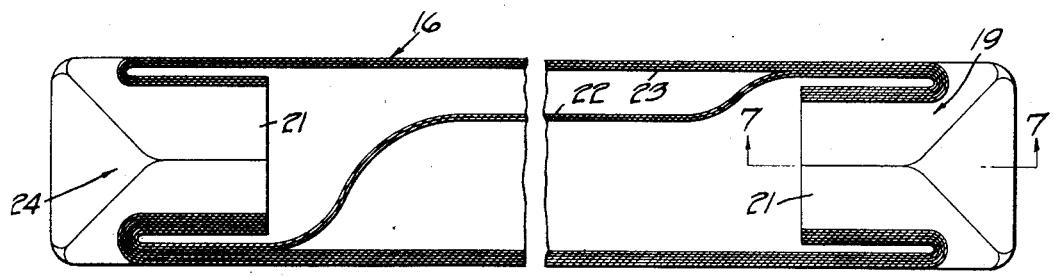
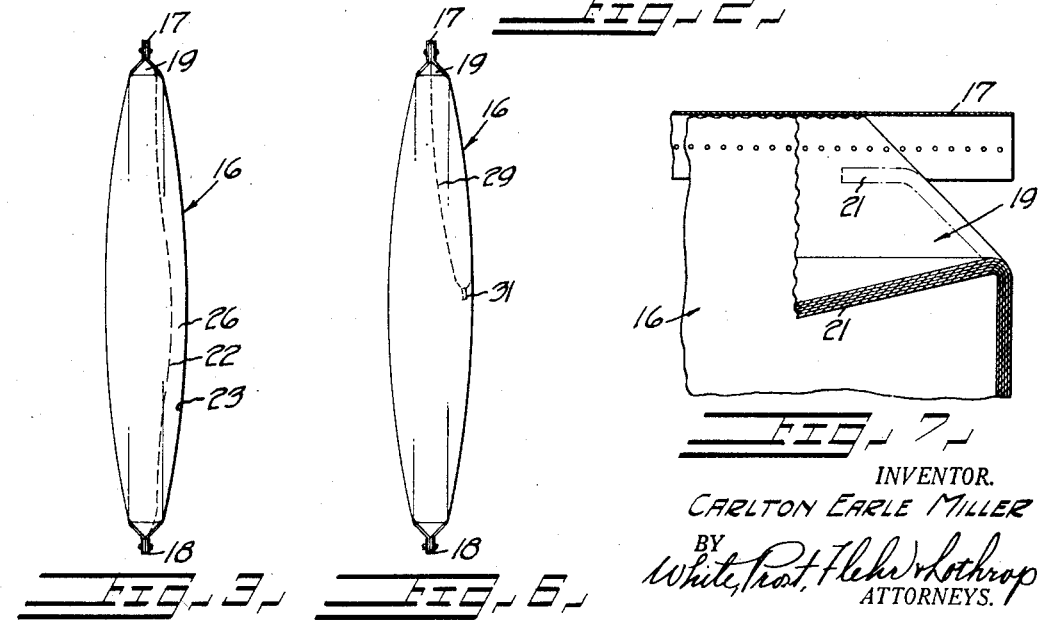
INVENTOR.
CARLTON EARLE MILLER
BY
ATTORNEYS.

Patented Dec. 19, 1933

1,940,221

UNITED STATES PATENT OFFICE 1,940,221

CEMENT BAG

Carlton Earle Miller, Palo Alto, Calif.

Application March 16, 1931. Serial No. 522,849

4 Claims. (Cl. 229—56)

My invention relates to a container for cement and the like and more particularly it relates to a bag in which two separate compartments are provided. The invention also relates to a novel method of packing cement and an admix therefor.

Frequently, it is desirable to add certain substances to cement to improve or alter one or more characteristics thereof or of the concrete made from the cement. In my Patent No. 1,791,630, granted February 10, 1931, for example, there is disclosed a mixture of calcium chloride and diatomaceous earth for increasing the strength of the cement after it has become set. Other substances, such as pigments for imparting a color to the mix, are sometimes added to the cement, but irrespective of the material which is added, best results usually require that the admix be employed in definite proportions.

Heretofore, it has been customary to pack the cement and the admix in separable containers and under certain conditions it is even essential that they be packed separately and mixed at the job. Careless workmen sometimes mix the ingredients in the wrong proportions or forget entirely to add one of the ingredients in some of the batches, covering up their mistake temporarily by adding a surplus of the neglected ingredient in the following batches. Such conditions occasionally have disastrous consequences.

It is one object of my invention to provide a container for cement in which a separate compartment is provided for the reception of an admix.

Another object is to provide a container of the character described in which two or more ingredients can be packed separately and in which the ingredients can be removed simultaneously.

Still another object is to provide a container of the character described which is simple in construction and which can be manufactured economically.

A still further object is to devise a novel method for packing cement and an admix therefor.

These and other objects and advantages are attained in the embodiments of my invention illustrated in the accompanying drawing, in which:

Fig. 1 is a front view of a container embodying the principles of my invention.

Fig. 2 is a cross-section on an enlarged scale taken along the plane represented by line 2—2 of Fig. 1.

Fig. 3 is a side view of the container shown in Fig. 1.

Figs. 4 and 5 are front views of modified forms.

Fig. 6 is a side view of the container shown in Fig. 5.

Fig. 7 is a cross-sectional view of one type of valve which can be employed, taken on the plane indicated by the line 7—7 of Fig. 2.

In its preferred form the invention comprises a multi-ply bag having the top and bottom closed, but having an opening, known as a Bates valve, near one edge of the bag for enabling filling of the bag. When the bag is filled with cement or the like, a flap forming part of the valve automatically covers the opening and serves to retain the cement within the bag without further aid and without any substantial leakage. Preferably, a second Bates valve is provided which opens into the space between two of the plies of the bag and this space can be filled with any desired ingredients to be mixed with the cement. When the admix is deliquescent in nature, such as the admix described in my patent hereinbefore identified, the layers or plies forming the second compartment are preferably made of moisture proof material. When the bag is opened, the cement and the admix flow out together and are partially mixed as they leave the bag. It is apparent that if each bag of cement has a measured amount of the desired admix packed with it in this manner, a uniform mixture will be attained consistently and close supervision over the workmen in this respect is not necessary.

If desired, a smaller bag can be inserted within two of the plies of the larger bag to confine the admix in one location within the larger bag. However, it has not been found to be objectionable to allow the admix to flow where it will between the plies of the bag and for economical reasons I prefer the construction that dispenses with the smaller bag.

Referring now to the drawing and first to Figs. 1, 2 and 3 thereof, I have shown a bag 16 closed at both ends in any suitable manner as, for example, by sewing strips 17 and 18 along the edges thereof. The bag 16 can be made of any suitable sheet material, such as heavy paper, and preferably is of multi-ply construction, five layers of paper being used in the bag illustrated in Fig. 2. Near one corner of the bag and communicating with the interior thereof is a Bates valve, shown in detail in Figs. 2 and 7. The valve 19 has a flap 21 which normally takes the position shown in full lines in Fig. 7 when the bag is empty, but when the bag is filled with cement or the like, the flap 21 moves to the position shown in dotted lines in Fig. 7, being forced into this position by the pressure of the cement in the bag.

While I prefer to employ this type of valve, the valve per se is not part of my invention.

Two of the plies entering into the construction of the bag, such as the plies 22 and 23, are preferably made of moisture proof material, such as oiled paper. At another corner of the bag, and communicating with the space between the layers 22 and 23 is a second Bates valve 24. This valve 24 is similar in every respect with the valve 19 except that it is formed of fewer plies of the material of which the bag is made, than the valve 19.

As heretofore mentioned, and as illustrated in Fig. 2, the valve 24 communicates with the space between the layers 22 and 23 of the bag. The ingredient 26 which it is desired to add to the cement at the job is adapted to be admitted through the valve 24 and fall into the space between the layers 22 and 23, as illustrated in Fig. 3. Preferably, this ingredient 26 is admitted to the bag first and thereafter the cement is delivered into the main compartment of the bag through the valve 19 causing the bag to take the form illustrated in Fig. 3. It is to be understood that any proportion of the admix and cement can be packed in their individual compartments. For example, when an admix of the type disclosed in my above mentioned patent is employed, six pounds of the admix can be packed in the same container with ninety-three pounds of cement and it is a simple matter to measure the ingredients just before or at the time they are being placed into the bag. If desired, a suitable indicia 27 can be provided near one of the valves to indicate which valve opens into the main compartment and which opens into the compartment formed between the layers of the bag.

As illustrated in Fig. 2, the cement is protected on all sides by five layers of paper and on the upper side, as viewed in Fig. 2, it is also protected by a layer of the admix. The admix is protected on one side by two layers of paper and by the cement and on the other side it is protected by three layers of paper. Three layers of paper afford ample protection for the admix and since the layers 22 and 23 are preferably oiled paper, the compartment for the admix is moisture proof. Since the oiled paper layers 22 and 23 extend about the entire bag, the compartment for the cement is likewise moisture proof, thus both of the ingredients are adequately protected in a bag constructed in the form shown in Figs. 1, 2 and 3.

To remove the contents of the bag, either the strip 17 or the strip 18 is removed together with the stitches holding the same in place, thus opening both compartments and allowing the two ingredients within the bag to flow out simultaneously and causing the ingredients to mix with each other while they are flowing.

It is to be understood that any desired arrangement of the two valves relative to each other can be employed. Thus, in Fig. 4 I have illustrated a modification in which the valve 28 communicating with the compartment between two of the layers in the bag is disposed diagonally opposite the valve 19 which communicates with the main compartment of the bag.

In Figs. 5 and 6 I have shown a modification in which a smaller bag 29 is placed inside of the larger bag, either within the main compartment or between two of the layers of the larger bag. The bag 29 is closed at its lower end by a strip 31 and at the top it is closed by the strip 17 which is also used to close the main bag. A valve 32 is provided for filling the bag 29 and a separate valve 19 is employed, as before, to fill the main compartment within the bag. In emptying the bag of Fig. 5, removal of the strip 17 will open both bags and permit the materials within the bag to be removed simultaneously. It will be noticed however, that removal of the lower strip 18 will serve to open only the main compartment in the bag, thus permitting the cement to be removed separately if desired.

In employing my novel container and method for packing cement and an admix therefor, it will be apparent that errors in mixing the ingredients will be minimized, since the accuracy of the mixture is not dependent on the labor employed at the job.

While I have shown and described certain preferred embodiments of my invention, I do not wish to be limited thereto, since the invention can be embodied in a plurality of other forms.

I claim:

1. A container of the character described comprising a bag having two separate compartments, said bag having separate openings through which each compartment can be filled individually and a removable strip on said bag adapted when removed to open both of said compartments simultaneously.

2. A container for cement and the like comprising a plurality of layers of sheet-material forming an envelope, said layers being contiguous for a portion of the extent of said envelope and being spaced apart for the remainder of the extent of said envelope to provide two compartments, a separate filling means for each compartment, and a common discharge means for both compartments.

3. A container for cement and the like comprising a bag having two compartments therein, a separate filling means for each compartment, and a common discharge means for both compartments.

4. A container for cement and the like comprising a bag having two compartments and constituted of a plurality of layers of sheet-material forming an envelope, a portion of which is common to both compartments, a separate filling means for each compartment, and a common discharge means for both compartments.

CARLTON EARLE MILLER.